US011661899B1

United States Patent
Doemer et al.

(10) Patent No.: US 11,661,899 B1
(45) Date of Patent: May 30, 2023

(54) METHOD FOR DETECTING EXCESSIVE EGR FLOW

(71) Applicant: Ford Global Technologies, LLC, Dearborn, MI (US)

(72) Inventors: Edward Doemer, Dearborn Heights, MI (US); Sumanth Reddy Dadam, New Hudson, MI (US); Patrick Edward Smithberger, Marine City, MI (US); Adam Krach, Canton, MI (US); Michiel J. Van Nieuwstadt, Ann Arbor, MI (US); Bill Courtney, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/809,836

(22) Filed: Jun. 29, 2022

(51) Int. Cl.
*F02D 41/00* (2006.01)
*F02D 41/14* (2006.01)
*F02D 41/24* (2006.01)
*F02M 26/49* (2016.01)
*F02D 41/18* (2006.01)

(52) U.S. Cl.
CPC ..... *F02D 41/0072* (2013.01); *F02D 41/0077* (2013.01); *F02D 41/1448* (2013.01); *F02D 41/18* (2013.01); *F02D 41/2422* (2013.01); *F02M 26/49* (2016.02); *F02D 2200/0406* (2013.01); *F02D 2200/101* (2013.01)

(58) Field of Classification Search
CPC ............ F02D 41/0072; F02D 41/0077; F02D 41/1448; F02D 41/18; F02D 41/2422; F02D 2200/0406; F02D 2200/101; F02M 26/49

USPC ............. 123/568.19, 568.21; 701/109; 73/114.31, 114.37, 114.74
See application file for complete search history.

(56) References Cited

U.S. PATENT DOCUMENTS 9,976,521 B1  5/2018  Jentz et al.
10,632,988 B2  4/2020  Jentz et al.

FOREIGN PATENT DOCUMENTS

| CN | 112983690 | * | 6/2021 | ............ F02M 26/49 |
| DE | 102018101356 A1 | | 7/2018 | |
| EP | 2472091 A1 | | 7/2012 | |
| JP | 3797067 | * | 7/2006 | ............ F02D 21/08 |
| KR | 100203093 B1 | | 6/1999 | |

* cited by examiner

*Primary Examiner* — Hai H Huynh
(74) *Attorney, Agent, or Firm* — Vincent Mastrogiacomo; McCoy Russell LLP

(57) ABSTRACT

Methods and systems are provided for diagnostics of exhaust gas recirculation (EGR) components including an EGR pressure sensor. In one example, a method for an exhaust gas recirculation (EGR) system of a vehicle comprises diagnosing an excessive EGR flow rate via an MAP-MAF strategy, the MAP-MAF strategy including estimating an EGR flow rate based on a difference between an output of a manifold absolute pressure (MAP) sensor of the vehicle and an output of a mass airflow (MAF) sensor of the vehicle; and in response to stable intrusive conditions being met, intrusively commanding an EGR valve of the EGR system to a closed position to confirm the diagnosed excessive EGR flow rate. If the excessive flow is detected after the EGR valve is commanded to the closed position, a diagnostic code may be set.

19 Claims, 7 Drawing Sheets

METHOD FOR DETECTING EXCESSIVE EGR FLOW

FIELD

The present description relates generally to methods and systems for diagnosing components of an exhaust gas recirculation (EGR) system.

BACKGROUND/SUMMARY

Engine systems may utilize recirculation of exhaust gas from an engine exhaust system to an engine intake system, a process referred to as exhaust gas recirculation (EGR), to reduce emissions. An EGR valve may be controlled to achieve a desired intake air dilution for the given engine operating conditions. Traditionally, the amount of EGR routed through the EGR system is measured and adjusted based on engine speed, engine temperature, and load during engine operation to maintain desirable combustion stability of the engine while providing emissions and fuel economy benefits. EGR effectively cools combustion chamber temperatures thereby reducing NOx formation. Also, EGR reduces pumping work of an engine resulting in increased fuel economy. An EGR flow through an EGR passage may be estimated via one or more pressure sensors coupled to the EGR passage. This estimated flow rate may be used to adjust EGR valve opening and control EGR flow.

Adhering to emissions standards may include detecting an excessive EGR flow when no EGR flow is commanded. If the excessive EGR flow is detected, a diagnostic code for an excessive EGR flow may be set, and activating a malfunction indicator light (MIL). The excessive EGR flow may be detected from a first measurement of EGR flow made by a sensor of the one or more pressure sensors, such as an exhaust gas pressure (EXP) sensor positioned upstream of the EGR valve. A second measurement of EGR flow may be made to confirm the primary estimate, for example, via a Differential Pressure Feedback (DPFE) sensor that measures EGR flow upstream and downstream of an orifice located in an EGR passage downstream of the EGR valve.

However, the inventors herein have recognized potential issues with accurately measuring the excessive EGR flow. As one example, Differential Pressure Over Valve (DPOV) EGR systems may not include the DPFE sensor, whereby there may not be a reliable secondary EGR measurement. For DPOV systems, one approach to confirming the primary measurement is to make a secondary estimate of the EGR flow based on a difference between an airflow computed from a manifold absolute pressure (MAP), and an airflow measured by a mass air flow (MAF) sensor. However, a drift in the MAF sensor may cause inaccuracies, resulting in a false excessive EGR flow indication.

In one example, the issues described above may be addressed by a method for an exhaust gas recirculation (EGR) system of a vehicle, comprising diagnosing an excessive EGR flow rate via an MAP-MAF strategy, the MAP-MAF strategy including estimating an EGR flow rate based on a difference between an output of a manifold absolute pressure (MAP) sensor of the vehicle and an output of a mass airflow (MAF) sensor of the vehicle; and in response to stable intrusive conditions being met, intrusively commanding an EGR valve of the EGR system to a closed position to confirm the diagnosed excessive EGR flow rate. If the excessive flow is detected after the EGR valve is commanded to the closed position, a diagnostic code may be set. In other words, a third check is performed when both a DPOV EGR flow rate estimate and an MAF/MAP-based flow rate estimate report excess EGR flow, where the third check is an intrusive test that includes disabling EGR flow for few events, commanding the EGR valve to the closed position, and monitoring the reported flow using both DPOV and the MAP-MAF strategy. If the reported EGR flow continues to report excess EGR flow during the EGR disabled events, a true EGR flow error is registered, and a corresponding flag (e.g., diagnostic code) is set. By performing the third check, potential inaccuracies in EGR flow detection due to MAF sensor drift may be reduced, and adherence to emissions standards may be ensured.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Figure 1:
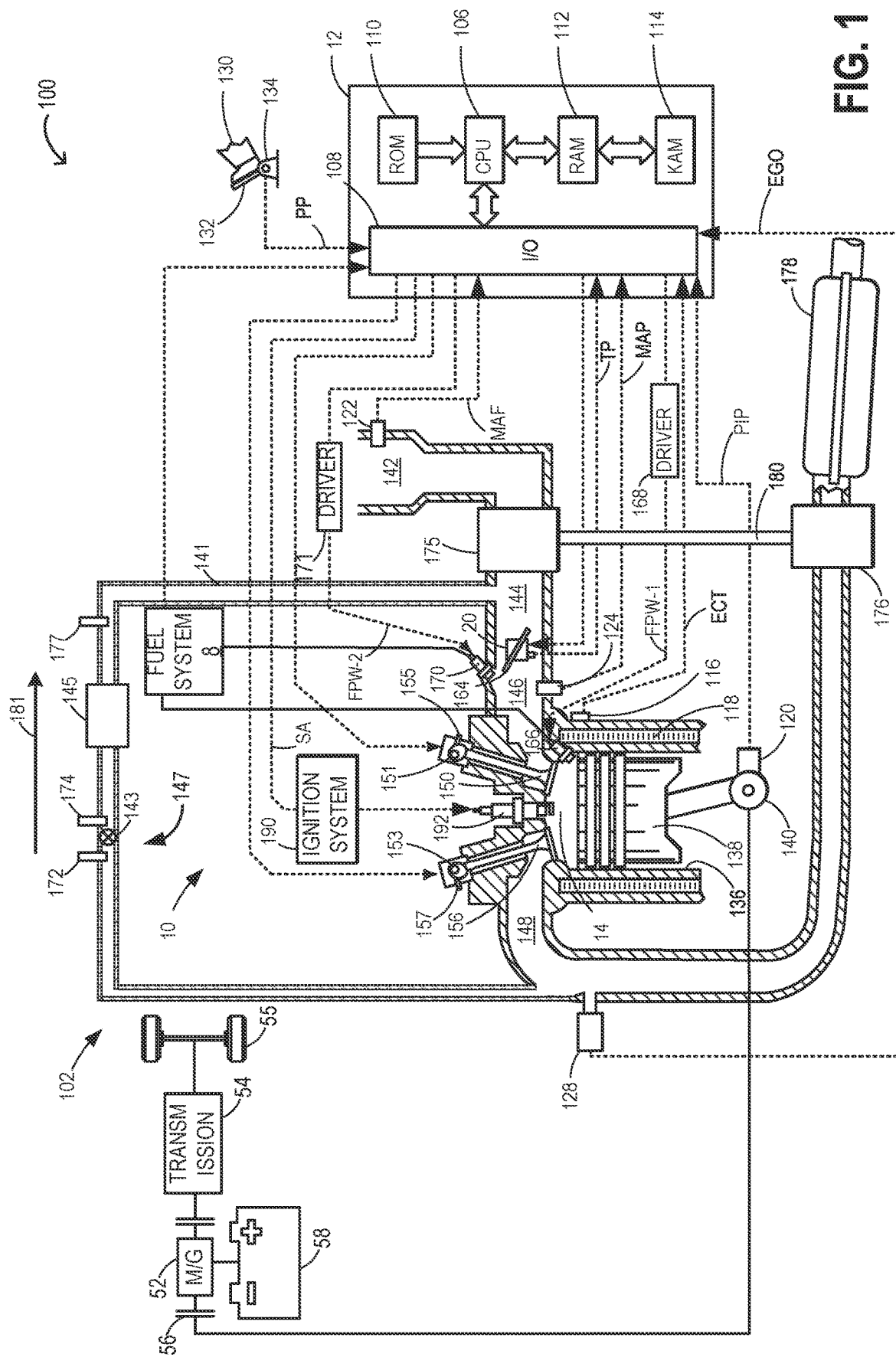
FIG. 1 shows an example engine system for a vehicle including an EGR system.

The following description relates to systems and methods for diagnosing excessive exhaust gas recirculation (EGR) flow in an EGR system. A hybrid vehicle system including an EGR system is shown in FIG. 1. The EGR system may be a Differential Pressure Over Valve (DPOV) EGR system, as described in reference to FIG. 2. The excessive EGR flow may be diagnosed via a DPOV measurement and/or based on a difference between an output of a mass air flow (MAF) sensor and an output of a manifold absolute pressure (MAP) of the EGR system, by following one or more steps of a method described in reference to FIG. 3A. The diagnosed excessive EGR flow may be confirmed by following one or more steps of a method described in reference to FIG. 3B. FIG. 4A shows a first exemplary sequence of events of the DPOV system in a condition where an excessive EGR flow is detected. FIGS. 4B and 4C each show a second exemplary sequence of events of the DPOV system where an excessive EGR flow is not detected.

FIG. 1 depicts an example embodiment 100 of a hybrid vehicle 102 including a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 175 arranged between intake passages 142 and 144, and an exhaust turbine 176 arranged along exhaust passage 148. Compressor 175 may be at least partially powered by exhaust turbine 176 via a shaft 180 where the boosting device is configured as a turbocharger. The turbocharger may be a variable geometry turbocharge (VGT) where exhaust turbine 176 may include guiding vanes arranged in a nozzle of the turbine. Gas flow into the exhaust turbine 176 may be adjusted by varying a position of the guiding vanes. A throttle 20 including a throttle plate 164 may be provided along an intake passage of the engine for varying the flow rate and/or pressure of intake air provided to the engine cylinders. For example, throttle 20 may be disposed downstream of compressor 175 as shown in FIG. 1, or alternatively provided upstream of compressor 175.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

As a non-limiting example, cylinder 14 is shown including two fuel injectors 166 and 170. Fuel injector 166 is configured to deliver diesel or gasoline to the combustion chamber from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alternative, alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in an optional configuration that provides what is known as port injection of fuel (hereafter referred to as "PFI") into the intake port upstream of cylinder 14. Fuel injector 170 may inject fuel such as gasoline, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

As described above, FIG. 1 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The engine may include an exhaust gas recirculation (EGR) system 147, including one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. EGR system 147 includes an exhaust passage 148, through which exhaust gases may be recirculated to intake passage 144 via the EGR passage 141. In this example, the EGR passage 141 is coupled to the intake passage 144 upstream of the throttle 20, however, in alternate embodiments, the EGR passage 141 may be coupled to the intake passage 144 downstream of the throttle 20. A direction of flow of EGR through the EGR passage 141 is shown by arrow 181. The amount of EGR provided to intake passage 144 may be varied by controller 12 via EGR valve 143.

The EGR system 147 may include a first EGR pressure sensor 172 coupled to the EGR passage 141 upstream of the EGR valve 143 and a second EGR pressure sensor 174 coupled to the EGR passage 141 downstream of the EGR valve 143. A pressure in EGR passage 141 upstream of EGR valve 143 may be higher than a pressure in the EGR passage 141 downstream of EGR valve 143, where a difference in pressure upstream and downstream of the EGR valve may be directly proportion to an EGR flow rate. As such, a pressure differential across the EGR valve 143 as estimated based on outputs of the first EGR pressure sensor 172 and the second EGR pressure sensor 174 may be used to estimate the EGR flow rate through the EGR passage 141. An EGR system where the EGR flow is estimated based on outputs of pressure sensors arranged upstream and downstream of the EGR valve, such as EGR system 147, may be referred to as a Differential Pressure Over Valve (DPOV) EGR system.

Further, additional EGR sensors may be arranged within the EGR passage and may provide an indication of temperature, and oxygen concentration of the exhaust gas. An EGR cooler 145 may be coupled to the EGR passage downstream or upstream of the EGR valve 143. A temperature sensor 177 may be coupled to the EGR passage downstream of the EGR cooler 145 to estimate a temperature of EGR exiting the EGR cooler 145.

When EGR valve 143 is open, a portion of the exhaust gas generated at the cylinder 14 is diverted to the EGR passage 141. Controller 12 may command opening of the EGR valve 143 based on the estimated EGR flow rate in combination with other input such as engine load, speed, and temperature. While constant EGR flow is desirable to suppress NOx formation, under certain conditions, the EGR valve 143 is maintained closed. For example, during cold starts, exhaust gas pressure is low and as a result, the EGR valve 143 is kept closed to allow gas pressure to accumulate. Similarly, during engine operation under zero load, such as idling, the EGR valve 143 is closed. Allowing EGR to flow during engine idling may lead to combustion instability and erratic idling. Furthermore, during engine operation under peak loads, e.g., the engine is operating close to or at maximum load, dilution at the combustion chamber due to EGR is not desired due to the diminished power output resulting from burning a gas mixture with lower oxygen concentration. Thus during high engine loads, the EGR valve 143 is also closed.

Under some conditions a degradation may occur in the EGR valve 143, where when the EGR valve 143 is commanded closed, some exhaust gases may pass through the EGR valve 143. An excessive EGR flow when no EGR flow is commanded may violate emissions standards. To ensure adherence to emissions standards, a diagnostics routine may be periodically performed to detect an excessive EGR flow when no EGR flow is commanded. Detection of the excessive EGR flow is described in greater detail below, in reference to FIGS. 2-4B.

It will be appreciated that while the embodiment of FIG. 1 shows high pressure EGR (HP-EGR) via an HP-EGR passage coupled between the engine intake downstream of the turbocharger compressor and the engine exhaust upstream of the turbine, in alternate embodiments, the engine may be configured to also provide low pressure EGR (LP-EGR) being provided via an LP-EGR passage coupled between the engine intake upstream of the turbocharger compressor and the engine exhaust downstream of the turbine. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. When distinct HP-EGR and LP-EGR passages are included, the respective EGR flows may be controlled via adjustments to respective EGR valves.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from MAF sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; manifold absolute pressure signal (MAP) from sensor 124; EGR flow rate from first EGR pressure sensor 172 and second EGR pressure sensor 174. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by microprocessor unit 106 for performing the methods described below as well as other variants that are anticipated but not specifically listed.

In this way, the system of FIG. 1 enables a method of operating an engine wherein a desired engine dilution is provided by combining a plurality of engine diluents, the diluents selected based on respective combustion stability limits.

In some examples, vehicle 102 may be a hybrid vehicle with multiple sources of torque available to one or more vehicle wheels 55. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Figure 2:
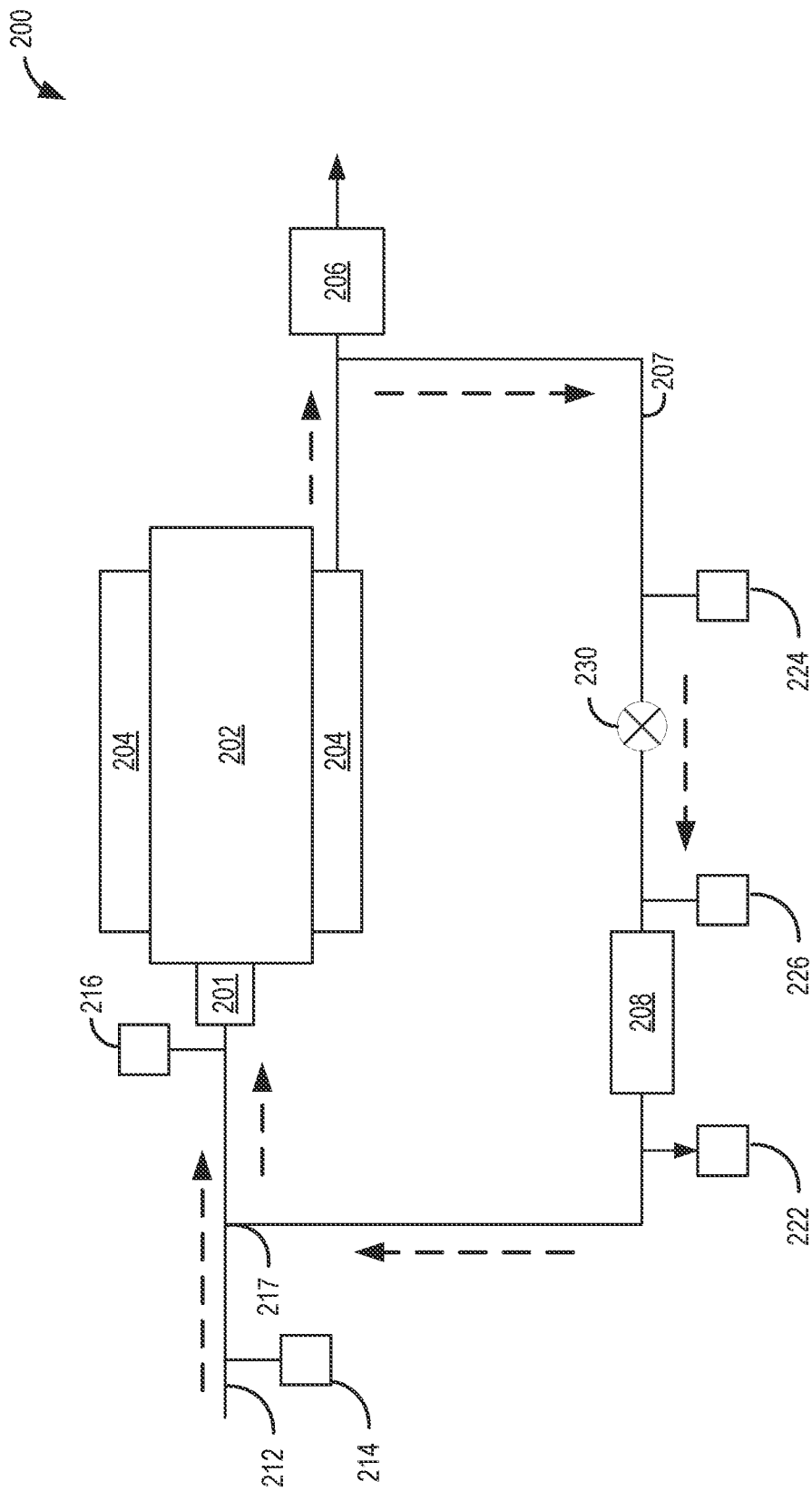
FIG. 2 shows a schematic diagram of a Differential Pressure Over Valve (DPOV) EGR system, in accordance with one or more embodiments of the present disclosure.

FIG. 2 shows a simplified exemplary DPOV EGR system 200 (also referred to herein as DPOV system 200) of a vehicle. DPOV system 200 may be a non-limiting example of the EGR system described above in reference to hybrid vehicle 102 of FIG. 1. DPOV system 200 includes an engine 202, which may receive fresh air at an intake manifold 201 via an intake passage 212. An air flow through intake passage 212 may be measured by a MAF sensor 214 (e.g., MAF sensor 122 of FIG. 1), and a pressure of air entering intake manifold 201 may be measured by a MAP sensor 216 (e.g., MAP sensor 124).

Engine 202 may output exhaust gases to an exhaust manifold 204. The exhaust gases may be routed from exhaust manifold 204 to an aftertreatment system 206 to be released into the environment. Prior to entering the aftertreatment system 206, a portion of the exhaust gases may be routed to intake manifold 201 of engine 202 via an EGR passage 207 (e.g., EGR passage 141). A temperature of the exhaust gases may be cooled prior to entering intake manifold 201 by a cooler 208, based on a temperature measurement of the exhaust gases taken by a temperature sensor 222.

A flow rate of the exhaust gases (e.g., an EGR flow rate) to the intake manifold 201 may be controlled via an EGR valve 230, which may be adjusted by a controller of the vehicle (e.g., controller 12). A pressure of the exhaust gases upstream of the EGR valve 230 may be measured by a first (EXP) pressure sensor 224, and a pressure of the exhaust gases downstream of the EGR valve 230 may be measured by a second (EGRP) pressure sensor 226 (e.g., first EGR pressure sensor 172 and second EGR pressure sensor 174 of FIG. 1). As described in greater detail below, the EGR flow rate may be estimated based on a difference between an output of the EXP sensor 224 and the EGRP sensor 226.

The EGR flow rate may also be estimated from an output of MAF sensor 214 and an output of MAP sensor 216. A first engine airflow at air intake 212 may be measured by MAF sensor 214. A second airflow at intake manifold 201 may be calculated as a function of the output of the MAP sensor, an engine volumetric efficiency calibration term, and other parameters such as vehicle speed (e.g., RPM), temperature. The second airflow may be a sum of the first airflow (e.g., MAF) and a flow rate of EGR gases entering air intake passage 212 at 217. Thus, the EGR flow rate may be approximately equal to a difference between the first airflow (e.g., the output of MAF sensor 214) and the second airflow (e.g., based on the output of MAP sensor 216).

However, the MAF sensor output may be inaccurate. For the purposes of this disclosure, the accuracy of the MAF sensor output may be based on a combination of base engine control range of authority and a part-to-part variability of the Air Intake System (AIS) as seen on the MAF signal, which is represented in Percent Deviation from the Ideal transfer function (dQ/Q or Delta Flow over Target Flow). This is measured on a flow stand by inducing a steady-state airflow for up to 30 seconds, and taking an average MAF signal measurement.

The engine volumetric efficiency calibration is a primary noise factor, as result of which an estimated EGR flow rate error of approximately ±8% of point may be introduced. For a relatively low EGR flow rate (mass fraction in-cylinder or in-manifold) of 5%, an 8% EGR flow rate error is equivalent to an EGR Rate error of 0.08*5=0.4. For a relatively high EGR rate of 20%, an 8% EGR flow rate error is equivalent to an EGR Rate error of 0.08*20=1.6.

Due to the inaccuracy of the MAF airflow measurement, a diagnostic routine that checks EGR flow, for example, to check for excessive EGR flow, may not accurately diagnose the excessive EGR flow based on the difference between the MAP output and the MAF output. As a result, additional diagnostics may be used to confirm the excessive EGR flow. In various embodiments, a first EGR flow rate estimated using DPOV may be compared to a second EGR flow rate estimated based on the difference between the MAP output and the MAF output. Additionally, the inaccuracy of the MAF sensor output may be higher at lower engine airflows, and an accuracy of the MAF sensor output may increase as an airflow increases. At higher airflows, EGR will typically be scheduled for fuel efficiency purposes. If a degradation (e.g., a leak) is detected at low airflows, EGR may be disabled and an MAF sensor measurement may be taken at areas of airflow with a more accurate MAF. As described in greater detail below in reference to FIG. 3B, an intrusive diagnostic routine may be used whereby additional estimates and/or measurements may be taken at different EGR valve positions. For example, the additional estimates and/or measurements may be taken when the EGR valve is commanded to a closed position.

Figure 3A:
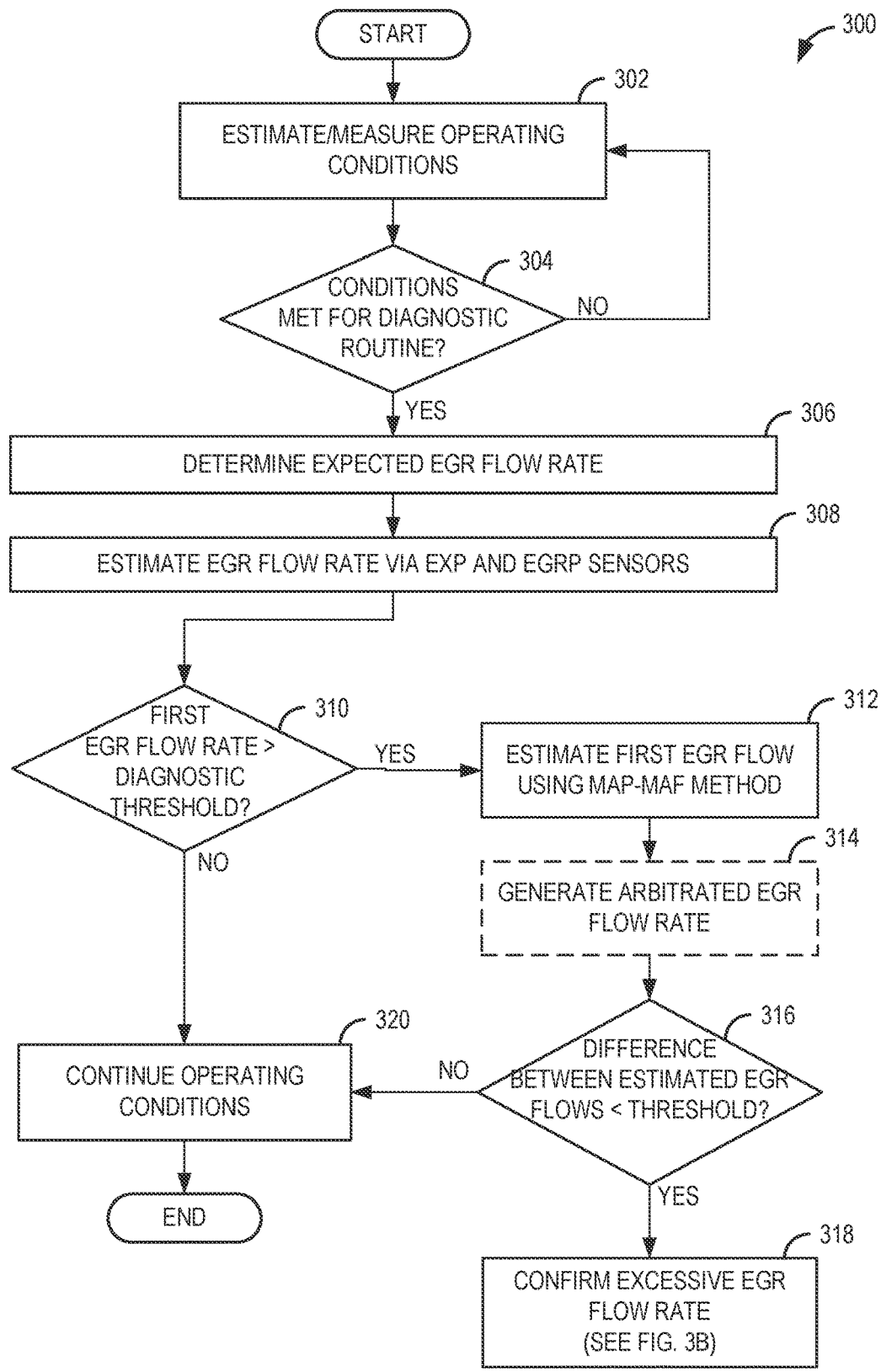
FIG. 3A shows a flowchart illustrating a first part of an example method for diagnosing excessive EGR flow in an EGR system, in accordance with one or more embodiments of the present disclosure.
Figure 4A:
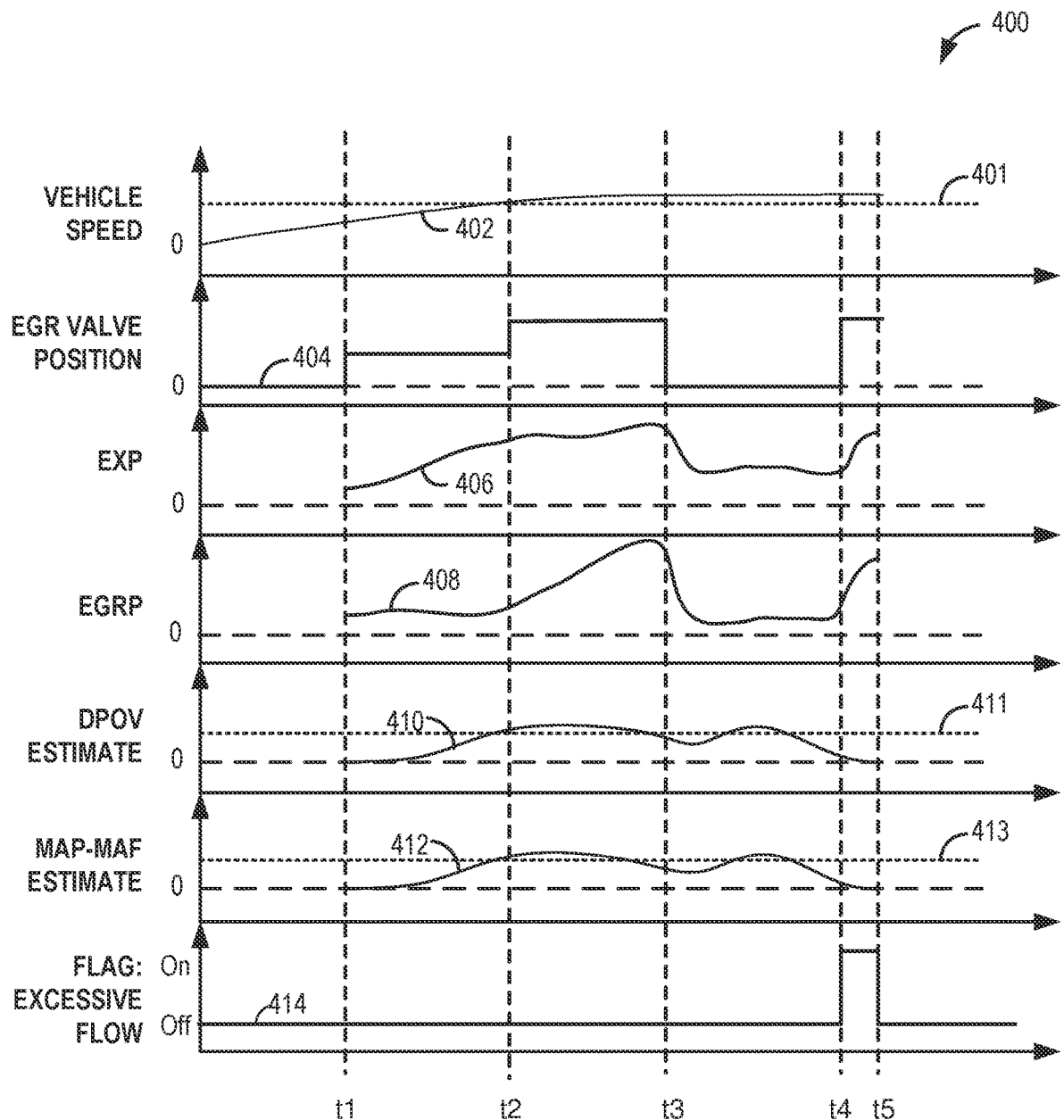
FIG. 4A is a timing diagram showing a first exemplary sequence of events of an EGR system during a diagnostic routine, in accordance with one or more embodiments of the present disclosure.
Figure 4B:
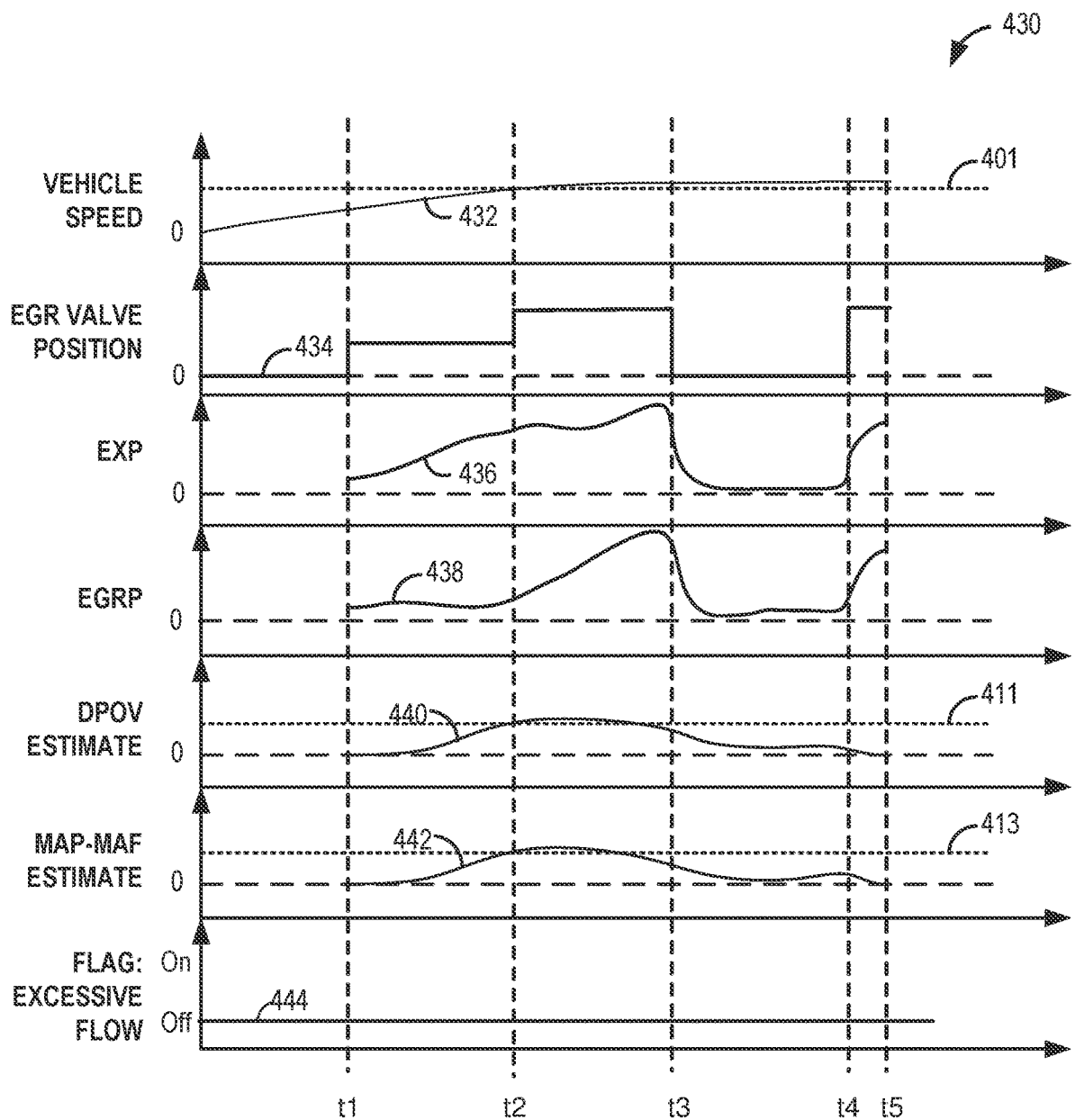
FIG. 4B is a timing diagram showing a second exemplary sequence of events of an EGR system during the diagnostic routine, in accordance with one or more embodiments of the present disclosure.
Figure 4C:
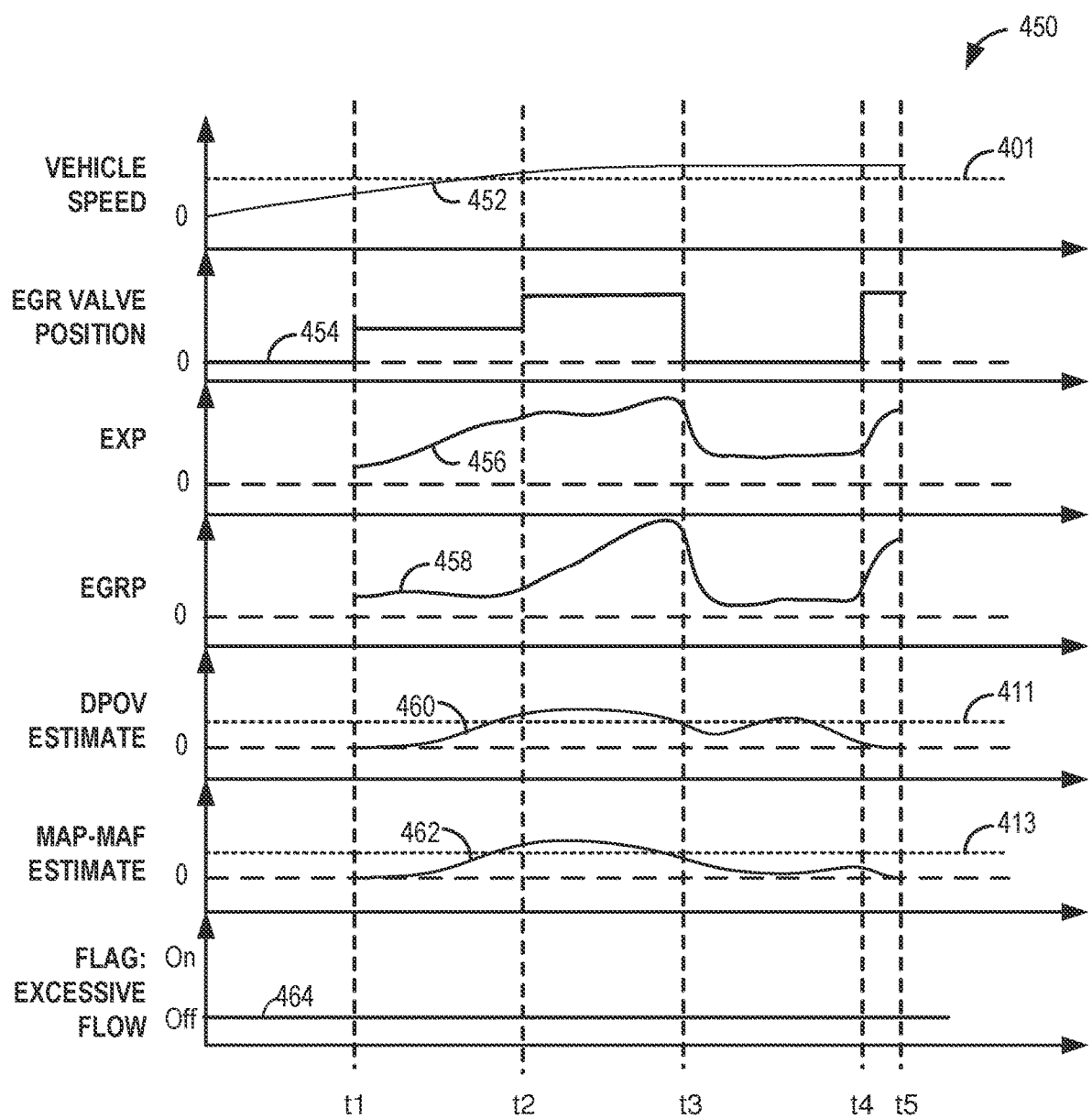
FIG. 4C is a timing diagram showing a third exemplary sequence of events of an EGR system during the diagnostic routine, in accordance with one or more embodiments of the present disclosure.

FIG. 3A shows an example method 300 for detecting an excessive flow of gases through an EGR system of a vehicle, such as the EGR system 147 of hybrid vehicle 102 of FIG. 1, via a first excessive EGR flow diagnostic routine. Instructions for carrying out method 300 and other methods described herein may be executed by a controller such as controller 12, based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 300 begins at 302, where method 300 includes estimating and/or measuring vehicle and engine operating conditions. The operating conditions may include vehicle speed, engine speed and load, engine temperature, exhaust temperature, gas pressures, mass air flow, etc.

Further, ambient conditions such as ambient temperature, pressure, and humidity may be estimated. The operating conditions may also include determining a position of an EGR valve of the EGR system, and/or an EGR flow rate of the EGR system. The controller may control the EGR flow rate based on engine operating conditions including engine load, engine speed, and engine temperature. In one example, EGR may be desired when the engine is not experiencing cold-start conditions and the engine load is between a lower threshold load and a higher threshold load. In another example, EGR may not be desired during cold-start conditions, engine idling conditions (engine load lower than the lower threshold load), and peak load conditions (engine load higher than the higher threshold load). If EGR is desired, the EGR valve may be in an open position, where exhaust gas may be routed from an exhaust passage to an intake passage of an engine of the vehicle. If EGR is not desired, the EGR valve may be in a closed position, and exhaust gas may not be recirculated to the engine.

At 304, method 300 includes determining whether conditions have been met for performing the excessive EGR flow diagnostic routine. In various embodiments, the conditions for performing the excessive EGR flow diagnostic routine may include the engine operating in a steady state, the EGR valve being in the open position, an engine temperature being above an engine temperature threshold, an ambient temperature being above an ambient temperature threshold, an ambient pressure being above an ambient pressure threshold and a commanded EGR flow rate being greater than a threshold flow rate. In one example, the threshold flow rate is 10%, where if the commanded EGR flow rate is greater than 10%, the conditions for running the diagnostic routine may be met. If the engine is not operating in a steady state, the EGR valve is not in the open position, the ambient pressure is less than the ambient pressure threshold, the ambient temperature is less than the ambient temperature threshold, the engine temperature is less than the engine temperature threshold, or the commanded EGR flow rate is less than the threshold flow rate, the conditions for running the diagnostic routine may not be met.

If at 304 it is determined that the conditions for running the diagnostic routine are not met, method 300 proceeds back to 302, to delay until the conditions for running the diagnostic routine are met. If at 304 it is determined that the conditions for running the diagnostic routine are met, method 300 proceeds to 306.

At 306, method 300 includes determining an expected EGR flow rate. The expected EGR flow rate may be generated by one or more algorithms of the controller, based on a commanded position of the EGR valve, a temperature of exhaust gases entering the intake manifold, and/or other inputs and/or operating conditions. In some embodiments, the expected EGR flow rate may be based on a speed/load lookup table populated with EGR flow rates based on steady state engine dynamometer testing.

At 308, method 300 includes generating a first estimate of a first EGR flow rate based on an output of an EXP sensor of the EGR system and an output of an EGRP sensor of the EGR system, where the EXP sensor is a pressure sensor positioned upstream of the EGR valve (e.g., EXP sensor 224), and the EGRP sensor is a pressure sensor positioned downstream of the EGR valve (e.g., EGRP sensor 226). The first estimate of the first EGR flow rate may be a function of the output of the EXP sensor and the output of the EGRP sensor (e.g., proportional to a difference between an EXP measurement and an EGRP measurement).

At 310, method 300 includes determining whether the first estimate of the first EGR flow rate exceeds a diagnostic threshold for excessive EGR flow, where the diagnostic threshold is based on the expected EGR flow rate. If the first estimate of the first EGR flow rate exceeds the diagnostic threshold, the EGR flow rate may be excessive. To determine the diagnostic threshold, an accuracy of the first estimate of the first EGR flow rate may be taken into account. For example, if the first estimate of the first EGR flow rate has an accuracy of approximately ±1.5% EGR, the diagnostic threshold may be set near 3.5% of the expected EGR flow rate (EGR (sqrt(1.5^2+1.6^2)=2.2% EGR), assuming independent accuracies for the first and second EGR estimates, where a 50% margin gives a threshold of 3.3%).

If the EGR flow rate does not exceed the diagnostic threshold, method 300 proceeds to 320. At 320, method 300 includes continuing the vehicle and engine operating conditions. Continuing vehicle and engine operating conditions may include maintaining the EGR valve at a current position, where the current position is determined by the controller based on a desired EGR flow. Alternatively, if the EGR flow rate exceeds the diagnostic threshold, method 300 proceeds to 312, where a verification of the excessive EGR flow may be performed.

At 312, method 300 includes generating a second estimate of the first EGR flow rate based on a MAP-MAF strategy, to verify the first estimate of the first EGR flow rate determined from the EXP and EGRP sensors as described above. In accordance with the MAP-MAF strategy, the second estimate of the first EGR flow rate is estimated based on an output of a MAF sensor (e.g., the MAF sensor 122 of FIG. 1) of the engine, and an output of a MAP sensor (e.g., the MAP sensor 124 of FIG. 1) of the engine. Specifically, the second estimate of the first EGR flow rate is calculated based on a difference between the output of the MAP sensor and the output of the MAF sensor, adjusted based on other factors such as an engine volumetric efficiency, temperature, and the like.

To enable a comparison of the first estimate (e.g., based on DVOP) and the second estimate (e.g., based on the MAP-MAF strategy), the MAF sensor output may be temperature corrected. Additionally, the second (e.g., MAP-MAF) estimate may rely on engine operating conditions being in a steady state to avoid transient inaccuracies.

At 314, in some embodiments, method 300 may include calculating an arbitrated EGR flow rate based on the first and second estimates of the first EGR flow rate. For example, the arbitrated EGR flow rate may be an average of the first and second estimates. Additionally, calculating the arbitrated EGR flow rate may take into account that an accuracy of the first estimate decreases for low pressure drops between the EXP sensor and the EGRP sensor, as a flow vs. pressure drop characteristic of the EGR valve has its largest slopes at low pressure drops. Therefore, the second estimate (e.g., the MAP-MAF-based EGR estimate) may be more accurate at low EGR flow rates, where the first estimate is less accurate. Based on the accuracy relationship between these two methods, in some embodiments, the arbitrated EGR flow rate estimate may be calculated by increasing a weighting of the first estimate for low EGR flow rates, and decreasing the weighting of the first estimate for higher EGR flow rates. The weights for these estimates may be predetermined for the EGR system (e.g., by a manufacturer) and stored in a lookup table in a memory of the controller, where the weights may be accessed during vehicle operation based on input conditions. The input conditions may include, the first estimate, the second estimate, and other relevant signals such as temperature, EGR valve position, engine RPM, and engine airflow, for example.

In one embodiment, the first estimate may be adjusted based on an upper and lower bound estimate generated from the second estimate. For example, the first estimate based on the pressure drop between the EXP sensor and the ERGP sensor may be 11% EGR. The second estimate based on the MAP-MAF strategy may be 12.5% EGR. An accuracy of the MAP-MAF-based strategy may be estimated at ±1% EGR, resulting in an EGR flow range of 11.5% to 13.5% EGR. The first estimate may adjusted to fall within the EGR flow range. For example, the arbitrated EGR flow rate may be adjusted to 11.5% EGR.

Once the arbitrated EGR flow rate has been calculated, the arbitrated EGR flow rate may be compared to the expected EGR flow rate to determine whether the EGR flow rate is excessive. At 316, method 300 includes determining whether the EGR flow rate estimated using the DPOV method (e.g., the first estimate) matches the EGR flow rate estimated using the MAP-MAF strategy (e.g., the second estimate). If a difference between the first estimate and the second estimate exceeds a threshold, it may be inferred that the excessive EGR flow diagnosed via the DPOV method may not be accurate, whereby method 300 proceeds to 320, and operating conditions are continued. In some examples, the inaccuracy may be addressed by taking a weighted estimate of the two EGR rates based on a confidence interval of the two EGR rates. Alternatively, if a difference between the first estimate and the second estimate does not exceed the threshold, it may be inferred that the excessive EGR flow diagnosed via the DPOV method may be accurate, whereby method 300 proceeds to 318.

At 318, method 300 includes confirming the excessive EGR flow rate. To confirm the excessive EGR flow rate, an additional EGR flow rate diagnostic routine may be performed, as described in greater detail below in reference to FIG. 3B.

Figure 3B:
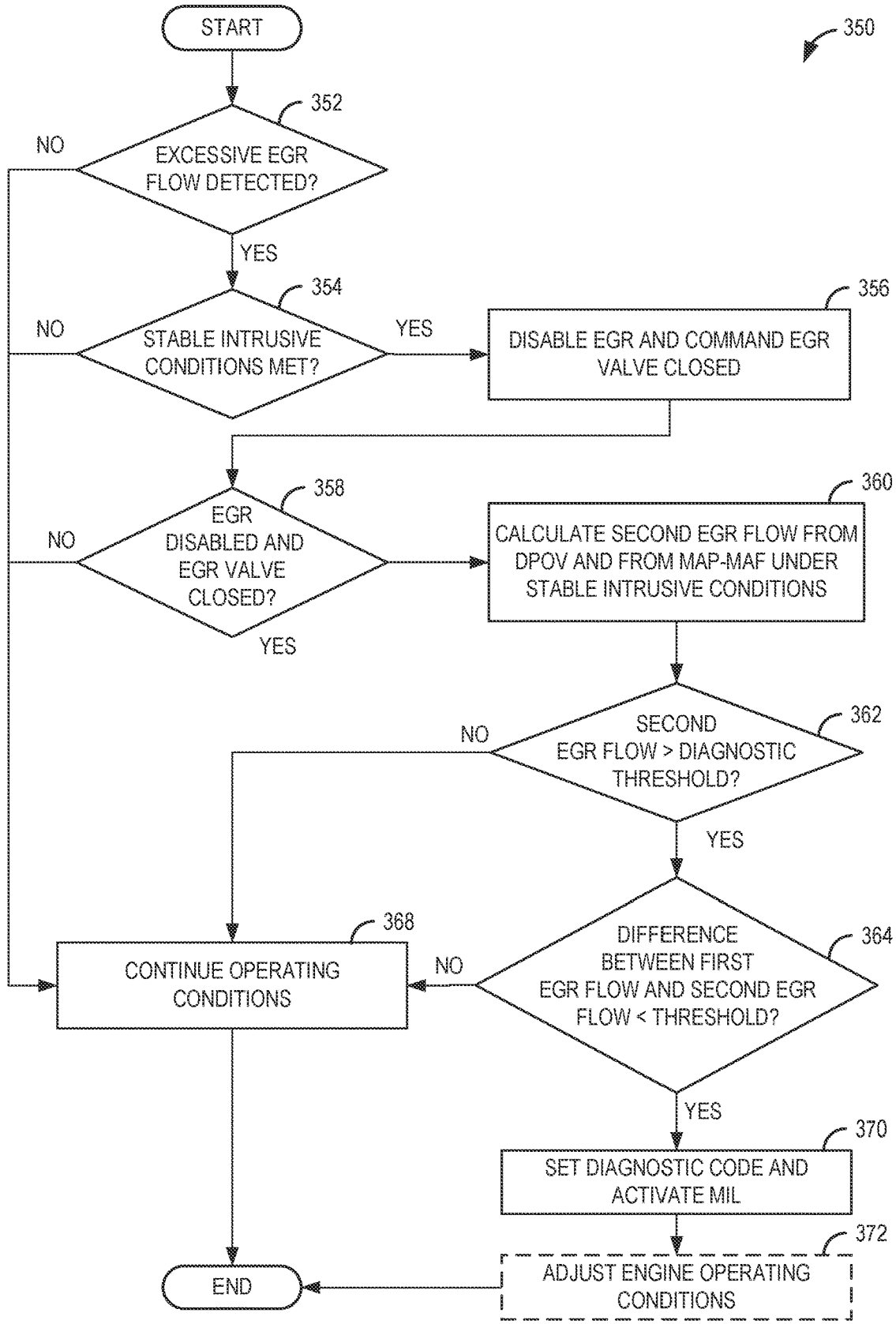
FIG. 3B shows a flowchart illustrating a second part of an example method for diagnosing excessive EGR flow in an EGR system, in accordance with one or more embodiments of the present disclosure.

FIG. 3B shows an example method 350 for confirming an excessive flow of EGR gases through an EGR system of an engine of a vehicle, such as the EGR system 147 of hybrid vehicle 102 of FIG. 1, via a second excessive EGR flow diagnostic routine. In various embodiments, method 350 may be carried out in response to having determined the excessive flow by carrying out one or more steps of method 300 of FIG. 3A.

Method 350 begins at 352, where method 350 includes determining whether excessive EGR flow was detected. For example, a first EGR flow may be estimated via a method such as method 300 of FIG. 3A, where the first EGR flow is determined to be excessive. If an excessive EGR flow is not detected at 352, method 350 proceeds to 368. At 368, method 350 includes continuing operating conditions of the vehicle. Continuing the operations of the vehicle includes maintaining the EGR valve at a current position, where the current position is determined by the controller based on a desired EGR flow. If an excessive EGR flow is detected at 352, method 350 proceeds to 354.

At 354, method 350 includes determining whether stable intrusive conditions are met for performing the second excessive EGR diagnostic routine. In various embodiments, the stable intrusive conditions may include a speed of the vehicle exceeding a threshold speed, where the threshold speed is a speed where an airflow rate of the engine is within a range that MAF output is above a threshold accuracy. For example, the threshold speed may be 40 miles per hour (mph). If the vehicle speed does not exceed the threshold speed, method 350 proceeds to 368, where operating conditions of the vehicle are continued. If the vehicle speed exceeds the threshold speed, method 350 proceeds to 356.

At 356, method 350 includes disabling the EGR system of the vehicle and commanding the EGR valve closed. After the EGR valve is commanded to the closed position, no EGR flow is expected through the EGR valve.

At 358, method 350 includes verifying whether the EGR system has been disabled and the EGR valve is in a closed and stable position. If the EGR system has not been disabled and/or the EGR valve is not in the closed and stable position, stable intrusive conditions for proceeding with the second excessive EGR flow diagnostic routine may not be met, whereby method 350 proceeds to 368 and operating conditions are continued. Alternatively, if it is verified that the EGR system has been disabled and the EGR valve is in the closed and stable position, stable intrusive conditions for proceeding with the second excessive EGR flow diagnostic routine may be met, whereby method 350 proceeds to 360.

At 360, method 350 includes calculating a second EGR flow rate, where the second EGR flow rate is an EGR flow rate measured when the EGR valve is closed. The second EGR flow rate may be estimated using both DPOV and the MAP-MAF strategy, as described above in reference to the first EGR flow rate. In other words, a first estimate of the second EGR flow rate may be calculated as a function of an output of a first sensor arranged upstream of the EGR valve (e.g., EXP sensor 224 of FIG. 2), and an output of a second sensor arranged downstream of the EGR valve (e.g., EGRP sensor 226 of FIG. 2), as described above in reference to FIG. 3A. A second estimate of the second EGR flow rate may be calculated based on an output of a MAF sensor (e.g., the MAF sensor 122 of FIG. 1) of an engine of the vehicle, and an output of a MAP sensor (e.g., the MAP sensor 124 of FIG. 1) of the engine, as described above in reference to FIG. 3A. The second estimate of the second EGR flow rate may be calculated based on outputs of the MAF sensor over various events, where an event may be considered an amount of time during driving where steady state conditions are achieved and the EGR valve is intrusively commanded to a closed position. In some embodiments, a second arbitrated EGR flow rate estimate may be calculated based on the first estimate of the second EGR flow rate and the second estimate of the second EGR flow rate.

At 362, method 350 includes determining whether the second EGR flow rate (e.g., both of the first estimate of the second EGR flow rate and the second estimate of the second EGR flow rate, or the second arbitrated EGR flow rate) is greater than a diagnostic threshold, based on an expected EGR flow rate of close to zero due to the EGR valve being closed. In various embodiments, the diagnostic threshold may be calculated as described above in reference to FIG. 3A. If the second EGR flow rate is greater than the diagnostic threshold, method 350 may proceed to 364, to verify a consistency between the first EGR flow rate and the second EGR flow rate.

At 364, method 350 includes determining whether a difference between a first excessive EGR flow diagnosed based on the first EGR flow rate and a second excessive EGR flow diagnosed based on the second EGR flow rate is greater than a threshold. In other words, the excessive EGR flow rate based on the estimates of the EGR flow rate made using the DPOV method and the MAP-MAF strategy prior to closing the EGR valve are compared to the excessive EGR flow rate based on the estimates of the EGR flow rate made using the DPOV method and the MAP-MAF strategy after closing the EGR valve. If the estimates are consistent, it may be inferred that the EGR flow rate is excessive.

If the difference between the first excessive EGR flow diagnosed based on the first EGR flow rate and the second excessive EGR flow diagnosed based on the second EGR flow rate is greater than the threshold (e.g., the first EGR flow estimate and the second EGR flow estimate are not consistent), it may not be inferred that the EGR flow is excessive, whereby method 350 proceeds to 368, and operating conditions are continued (e.g., under the assumption that the system is performing to specs). Alternatively, if the difference between the first excessive EGR flow diagnosed based on the first EGR flow rate and the second excessive EGR flow diagnosed based on the second EGR flow rate is below the threshold (e.g., the estimates are consistent), it may be inferred that the EGR flow is excessive, whereby method 350 proceeds to 370.

In some embodiments, an excessive EGR flow indicated by the MAP-MAF strategy and/or DPOV may be additionally or alternatively confirmed by comparing a change in the EGR flow rate calculated with DPOV (e.g., the first estimate of the second flow rate) with a corresponding change in a position of the EGR valve. As the EGR flow rate changes, a flow cross-section area (e.g., an expected flow area) may be computed from EGR valve lift. The DPOV estimate may be calculated based on a change in pressure upstream and downstream of the EGR valve and the expected flow area. An increase in the EGR flow as the position of the EGR valve is adjusted from a closed position to a slightly more open position may indicate that the EGR valve is leaking. For example, a 0 mm to 0.15 mm change in the EGR valve position will produce a greater change in EGR flow than would be produced by a 0.15 mm to 0.30 mm change. If the EGR flow rate is greater than zero when the position of the EGR valve is closed, then the EGR valve may be commanded to a slightly more open position (e.g., 5%). If the increase in the EGR flow rate is below a threshold, it may be inferred that the EGR valve is leaking, while if the increase in the EGR flow rate is above the threshold, it may be inferred that the EGR valve is not leaking.

At 370, method 350 includes setting a diagnostic code for excessive EGR flow, and notifying a user of the vehicle of the excessive EGR flow by activating a malfunction indicator light (MIL) of the vehicle (e.g., arranged on a dashboard of the vehicle). Additionally, at 372, method 350 may include adjusting engine operating conditions in response to the excessive EGR flow. For example, a spark timing may be advanced and CAM overlap may be reduced to maintain combustion stability.

FIG. 4A shows a first example timing diagram 400, showing a first exemplary sequence of events of an EGR system during a diagnostic routine to determine an excessive EGR flow in an engine of a vehicle. As described above in reference to FIGS. 3A and 3B, the excessive EGR flow may be estimated in a first manner in accordance with a DPOV strategy based on outputs of a first EGR pressure sensor (e.g., EXP sensor 172 in FIGS. 1 and/or 224 of FIG. 2) coupled upstream of an EGR valve (e.g., EGR valve 143 in FIG. 1) housed in an EGR passage (such as EGR passage 141 in FIG. 1) and a second EGR pressure sensor (e.g., EGRP sensor 174 in FIGS. 1 and/or 224 of FIG. 2) coupled downstream of the EGR valve. The excessive EGR flow may be estimated in a second manner in accordance with an MAP-MAF strategy (e.g., to confirm the estimate) by comparing outputs of a MAF sensor (MAF sensor 122 of FIG. 1) and a MAP sensor (e.g., MAP sensor 124 of FIG. 1) coupled to an intake manifold of the engine. A difference between the estimates of EGR flow using the DPOV strategy and the MAP-MAF strategy at different EGR valve positions may be used to determine the excessive flow, as described in FIGS. 3A and 3B.

A horizontal (x-axis) of timing diagram 400 denotes time and the vertical markers t1-t5 identify significant times in EGR pressure sensor diagnostics. Timing diagram 400 includes seven plots. A first plot, line 402, shows an engine speed measured in RPM. A dotted line 401 indicates a threshold engine speed at which steady state engine conditions are met for an intrusive diagnostic test to be performed. A second plot, line 404, shows a degree of opening of the EGR valve controlling EGR flow from an exhaust passage to an intake passage of the engine via the EGR passage. A third plot, line 406, shows a change in EGR pressure (EXP) upstream of the EGR valve, as estimated via the first EGR pressure sensor. A fourth plot, line 408, shows a change in EGR pressure (EGRP) downstream of the EGR valve as estimated via the second EGR pressure sensor. A fifth plot, line 410, denotes a ratio of the EGR pressure (EXP) upstream of the EGR valve to the EGR pressure (EGRP) downstream of the EGR valve, from which a first estimate of EGR flow may be made via DPOV. A dotted line 411 indicates a diagnostic threshold for excessive EGR flow. A sixth plot, line 412, shows a second estimated EGR flow, based on the MAP-MAF strategy. A dotted line 413 indicates the diagnostic threshold for excessive EGR flow. The seventh plot, line 414, shows a position of a flag indicating an excessive EGR flow rate. When the flag is in the ON position, a diagnostic code for the excessive EGR flow may be set in the EGR system.

Prior to time t1, EGR is not desired for engine operation and the EGR valve is maintained in an off position. Since EGR is not flowing through the EGR passage, EXP and EGRP are not monitored. The flag is maintained in an off position. At time t1, in response to changes in engine operating conditions, EGR flow is enabled. The level of EGR flow desired by the engine is estimated by the controller as a function of engine speed and engine load. The opening of the EGR valve is adjusted based on the desired level of EGR flow. Between t1 and t2, an effect of EGR valve opening on the EGR flow is shown. A first estimate of the EGR flow rate is shown by line 410 as a function of a ratio between EXP and EGRP, where the EGR flow rate increases as a result of EXP increasing faster than EGRP.

At time t2, in response to increased demand for EGR, the EGR valve opening is increased. Between t2 and t3, the ratio of EXP and EGRP indicates an increasing EGR flow rate, which increases above the diagnostic threshold for excessive EGR flow according to the DPOV estimate.

As a result of a first DPOV estimate of excessive EGR flow rate, a second estimate of the EGR flow rate may be made based on the MAP-MAF strategy to verify the first DPOV estimate, which may also increase above the diagnostic threshold for excessive EGR flow (e.g., indicated by line 413). As shown by a similarity between lines 410 and 412, the second estimate of the EGR flow rate made based on the MAP-MAF strategy may be substantially similar to the first DPOV estimate (e.g., within a threshold difference).

As a result of the first DPOV estimate being substantially similar to the second MAP-MAF estimate, the excessive flow diagnosed by the first DPOV estimate may be verified.

At time t3, as a result of the first DPOV estimate being verified by the second MAP-MAF estimate, a second, intrusive diagnostic routine may be initiated to confirm the excessive EGR flow. The second, intrusive diagnostic routine may rely on intrusive steady state conditions being met, such as the RPM of the engine being steady, as shown by line 402. In response to the intrusive steady state conditions being met, the EGR valve is commanded to a closed position. When the EGR valve is commanded to the closed position, the EGR flow rate decreases towards zero, as indicated by lines 406 and 408. However, a pressure differential is observed in the ratio of EXP and EGRP, where the EGR flow rate does not decrease to zero as expected. The EGR flow rate is estimated again via the DPOV strategy, which indicates that the EGR flow rate is excessive (e.g., where line 410 increases above the diagnostic threshold indicated by dotted line 411). The EGR flow rate is estimated again via the MAP-MAF strategy, which also indicates that the EGR flow rate is excessive (e.g., where line 412 increases above the diagnostic threshold indicated by dotted line 413). The excessive EGR flow rate may indicate a leak in the EGR system (e.g., a degradation in the EGR valve, a degradation in an EGR passage, etc.).

At time t4, as a result of the first estimate of the EGR flow rate based on DPOV being within a threshold difference of the second estimate of the EGR flow rate based on the MAP-MAF strategy, the first estimate and the second estimate of the EGR flow rate being above the diagnostic threshold for an excessive flow rate, and the diagnosis of the excessive EGR flow rate based on the first estimate and the diagnosis of the excessive EGR flow rate based on the second estimate of the EGR flow rate being substantially similar to the diagnoses of the excessive EGR flow rate based on estimates of the EGR flow rate made via the DPOV and MAP-MAF strategies prior to commanding the EGR valve to the closed position, a diagnostic flag is set in the EGR system indicating the excessive EGR flow rate. The EGR valve is commanded to an open position (e.g., to a same open position of the EGR valve prior to closing the EGR valve). When the EGR valve is opened, between time t4 and time t5, the EGR flow rate increases.

Thus, determining the excessive flow rate may rely on performing a first diagnostic test to see if EGR flow rates estimated by both the DPOV and MAP-MAF strategies match and exceed a diagnostic threshold flow rate under EGR flow conditions, and confirming the excessive EGR flow rate by commanding the EGR valve to a closed position and performing a second diagnostic test to see if EGR flow rates estimated by both the DPOV and MAP-MAF strategies match, exceed the diagnostic threshold flow rate under EGR no-flow conditions, and additionally match the flow rate estimates made prior to closing the EGR valve.

FIG. 4B shows a second example timing diagram 430, showing a second exemplary sequence of events of the EGR system of FIG. 4A during the diagnostic routine to determine an excessive EGR flow in an engine of a vehicle. Second example timing diagram 430 includes the same horizontal (x-axis) of timing diagram 400 denoting time and the vertical markers t1-t5 identifying significant times in EGR pressure sensor diagnostics. Timing diagram 430 includes seven plots. A first plot, line 432, shows an engine speed measured in RPM. A dotted line 401 indicates a threshold engine speed at which steady state engine conditions are met for an intrusive diagnostic test to be performed. A second plot, line 434, shows a degree of opening of the EGR valve controlling EGR flow from an exhaust passage to an intake passage of the engine via the EGR passage. A third plot, line 436, shows a change in EGR pressure (EXP) upstream of the EGR valve, as estimated via the first EGR pressure sensor. A fourth plot, line 438, shows a change in EGR pressure (EGRP) downstream of the EGR valve as estimated via the second EGR pressure sensor. A fifth plot, line 440, denotes a ratio of the EGR pressure (EXP) upstream of the EGR valve to the EGR pressure (EGRP) downstream of the EGR valve, from which a first estimate of EGR flow may be made via DPOV. A dotted line 411 indicates a diagnostic threshold for excessive EGR flow. A sixth plot, line 442, shows a second estimated EGR flow, based on the MAP-MAF strategy. A dotted line 413 indicates the diagnostic threshold for excessive EGR flow. The seventh plot, line 444, shows a position of a flag indicating an excessive EGR flow rate.

Prior to time t1, EGR is not desired for engine operation and the EGR valve is maintained in an off position. Since EGR is not flowing through the EGR passage, EXP and EGRP are not monitored. The flag is maintained in an off position. At time t1, in response to changes in engine operating conditions, EGR flow is enabled, and between t1 and t2, an effect of EGR valve opening on the EGR flow is shown. A first estimate of the EGR flow rate via DPOV shown by line 440 shows the EGR flow rate increasing as a result of EXP increasing faster than EGRP.

At time t2, in response to increased demand for EGR, the EGR valve opening is increased. Between t2 and t3, the ratio of EXP and EGRP indicates an increasing EGR flow rate, which increases above the diagnostic threshold for excessive EGR flow according to the DPOV estimate. As a result of a first DPOV estimate of an excessive EGR flow rate, a second estimate of the EGR flow rate may be made based on the MAP-MAF strategy to verify the first DPOV estimate, which may also increase above the diagnostic threshold for excessive EGR flow (e.g., above line 413). As shown by a similarity between lines 440 and 442, the second estimate of the EGR flow rate made based on the MAP-MAF strategy may be substantially similar to the first DPOV estimate (e.g., within a threshold difference). As a result of the first DPOV estimate being substantially similar to the second MAP-MAF estimate, the excessive flow diagnosed by the first DPOV estimate may be verified.

At time t3, as a result of the first DPOV estimate of excessive EGR flow being verified by the second MAP-MAF estimate, a second, intrusive diagnostic routine may be initiated to confirm the excessive EGR flow. The second, intrusive diagnostic routine may rely on intrusive steady state conditions being met, such as the RPM of the engine being steady, as shown by line 432. In response to the intrusive steady state conditions being met, the EGR valve is commanded to a closed position. When the EGR valve is commanded to the closed position, the EGR flow rate decreases towards zero, as indicated by lines 436 and 438. With the EGR valve closed, no significant pressure differential is observed in the ratio of EXP and EGRP, and the EGR flow rate is close to zero as expected. The EGR flow rate is estimated again via the DPOV strategy, which indicates that the EGR flow rate is not excessive (e.g., where line 440 does not increase above the diagnostic threshold indicated by dotted line 411). The EGR flow rate is estimated again via the MAP-MAF strategy, which also indicates that the EGR flow rate is not excessive (e.g., where line 442 does not increase above the diagnostic threshold indicated by dotted line 413).

At time t4, as a result of the second estimates of the EGR flow rate made via the DPOV and MAP-MAF strategies being consistent and being below the diagnostic threshold for an excessive flow rate, a diagnostic flag is not set in the EGR system indicating an excessive EGR flow rate. The EGR valve is commanded to an open position (e.g., to a same open position of the EGR valve prior to closing the EGR valve). When the EGR valve is opened, between time t4 and time t5, the EGR flow rate increases. Thus, in this sequence of events, the diagnosis of the excessive EGR flow rate based on first estimates of the EGR flow rate made via the DPOV and MAP-MAF strategies prior to closing the EGR valve were not confirmed.

FIG. 4C shows a third example timing diagram 450, showing a third exemplary sequence of events of the EGR system of FIGS. 4A and 4B during the diagnostic routine to determine an excessive EGR flow in an engine of a vehicle. Third example timing diagram 450 includes the same horizontal (x-axis) of timing diagrams 400 and 430 denoting time and the vertical markers t1-t5 identifying significant times in EGR pressure sensor diagnostics. Timing diagram 450 includes seven plots. A first plot, line 452, shows an engine speed measured in RPM. A dotted line 401 indicates a threshold engine speed at which steady state engine conditions are met for an intrusive diagnostic test to be performed. A second plot, line 454, shows a degree of opening of the EGR valve controlling EGR flow from an exhaust passage to an intake passage of the engine via the EGR passage. A third plot, line 456, shows a change in EGR pressure (EXP) upstream of the EGR valve, as estimated via the first EGR pressure sensor. A fourth plot, line 458, shows a change in EGR pressure (EGRP) downstream of the EGR valve as estimated via the second EGR pressure sensor. A fifth plot, line 460, denotes a ratio of the EGR pressure (EXP) upstream of the EGR valve to the EGR pressure (EGRP) downstream of the EGR valve, from which a first estimate of EGR flow may be made via DPOV. A dotted line 411 indicates a diagnostic threshold for excessive EGR flow. A sixth plot, line 462, shows a second estimated EGR flow, based on the MAP-MAF strategy. A dotted line 413 indicates the diagnostic threshold for excessive EGR flow. The seventh plot, line 464, shows a position of a flag indicating an excessive EGR flow rate.

Prior to time t1, EGR is not desired for engine operation and the EGR valve is maintained in an off position. Since EGR is not flowing through the EGR passage, EXP and EGRP are not monitored. The flag is maintained in an off position. At time t1, in response to changes in engine operating conditions, EGR flow is enabled, and between t1 and t2, an effect of EGR valve opening on the EGR flow is shown. A first estimate of the EGR flow rate via DPOV shown by line 460 shows the EGR flow rate increasing as a result of EXP increasing faster than EGRP.

At time t2, in response to increased demand for EGR, the EGR valve opening is increased. Between t2 and t3, the ratio of EXP and EGRP indicates an increasing EGR flow rate, which increases above the diagnostic threshold for excessive EGR flow. As a result of a first DPOV estimate of excessive EGR flow rate (e.g., indicated by line 460), a second estimate of the EGR flow rate may be made based on the MAP-MAF strategy to verify the first DPOV estimate, which also increases above the diagnostic threshold for excessive EGR flow. As shown by a similarity between lines 460 and 462, the second estimate of the EGR flow rate made based on the MAP-MAF strategy may be substantially similar to the first DPOV estimate (e.g., within a threshold difference). As a result of the first DPOV estimate being substantially similar to the second MAP-MAF estimate, the excessive flow diagnosed by the first DPOV estimate may be verified.

At time t3, as a result of the first DPOV estimate of excessive EGR flow being verified by the second MAP-MAF estimate, a second, intrusive diagnostic routine may be initiated to confirm the excessive EGR flow. The second, intrusive diagnostic routine may rely on intrusive steady state conditions being met, such as the RPM of the engine being steady, as shown by line 452. In response to the intrusive steady state conditions being met, the EGR valve is commanded to a closed position. When the EGR valve is commanded to the closed position, the EGR flow rate decreases towards zero, as indicated by lines 456 and 458. However, with the EGR valve closed, a pressure differential is observed in the ratio of EXP and EGRP, where the EGR flow rate as estimated by DPOV indicates that the EGR flow rate is excessive (e.g., where line 460 increase above the diagnostic threshold indicated by dotted line 411). The EGR flow rate is estimated again via the MAP-MAF strategy. However, the MAP-MAF estimate does not indicate that the EGR flow rate is excessive (e.g., where line 462 does not increase above the diagnostic threshold indicated by dotted line 413). Thus, the MAP-MAF estimate is not consistent with the DPOV estimate, whereby the excessive flow rate may not be confirmed.

At time t4, as a result of the second estimates of the EGR flow rate made via the DPOV and MAP-MAF strategies not being consistent, with the DPOV estimate being above the diagnostic threshold for an excessive flow rate and the MAP-MAF estimate being below the diagnostic threshold for an excessive flow rate, a diagnostic flag is not set in the EGR system indicating an excessive EGR flow rate. The EGR valve is commanded to an open position (e.g., to a same open position of the EGR valve prior to closing the EGR valve). When the EGR valve is opened, between time t4 and time t5, the EGR flow rate increases.

Thus, as described herein, methods are proposed to provide a reliable secondary EGR flow rate estimate for EGR systems, in particular, DPOV EGR systems that may not include a DPFE sensor. The secondary estimate of the EGR flow may be based on a difference between an airflow computed from a manifold absolute pressure (MAP), and an airflow measured by a mass air flow (MAF) sensor, and may be used to verify a primary estimate of an excessive EGR flow using DPOV. If the MAP-MAF estimate is consistent with the DPOV estimate, the excessive EGR flow may be verified. To address potential inaccuracies due to a drift in the MAF sensor, an additional intrusive diagnostic test may be performed during steady state engine operating conditions where an EGR valve is commanded to a closed position. When the EGR valve is closed, the EGR flow may be estimated again using the MAP-MAF strategy. If the MAP-MAF estimate after closing the EGR valve confirms the excessive EGR flow, a diagnostic flag of the EGR system indicating the excessive flow may be set. By confirming the primary DPOV estimate with a first MAP-MAF estimate made during flow conditions, and a second MAP-MAF estimate made during no-flow conditions, potential inaccuracies in EGR flow detection due to MAF sensor drift may be reduced, and adherence to emissions standards may be ensured. Additionally, if the DPOV estimate is not accurate, the MAP-MAF may be relied upon for setting the diagnostic flag.

The technical effect of verifying a primary EGR flow rate estimate with a secondary estimate made using the MAP-MAF strategy during EGR flow conditions, and confirming the secondary estimate by intrusively commanding the EGR valve closed and making an additional MAP-MAF estimate of the EGR flow rate at no-flow conditions, an excessive EGR flow may be accurately diagnosed and addressed to reduce emissions.

The disclosure also provides support for a method for an exhaust gas recirculation (EGR) system of a vehicle, the method comprising: diagnosing an excessive EGR flow rate via an MAP-MAF strategy, the MAP-MAF strategy including estimating an EGR flow rate based on a difference between an output of a manifold absolute pressure (MAP) sensor of the vehicle and an output of a mass airflow (MAF) sensor of the vehicle, and in response to stable intrusive conditions being met, intrusively commanding an EGR valve of the EGR system to a closed position to confirm the diagnosed excessive EGR flow rate. In a first example of the method, the stable intrusive conditions include a speed of an engine of the vehicle exceeding a threshold engine speed, the threshold engine speed a speed where an airflow rate of the engine is within a range where the output of the MAF sensor is above a threshold accuracy. In a second example of the method, optionally including the first example, estimating the EGR flow rate based on the difference between the output of the MAP sensor and the output of the MAF sensor further comprises: calculating an estimated airflow into an engine of the vehicle as a function of the output of the MAP sensor and one or more additional parameters, the one or more additional parameters including an engine volumetric efficiency calibration term, an engine speed, and a temperature of the airflow, and subtracting an airflow measurement outputted by the MAF sensor from the estimated airflow to generate an estimated EGR flow rate. In a third example of the method, optionally including one or both of the first and second examples, the EGR valve is intrusively commanded to the closed position to confirm the diagnosed excessive EGR flow rate in response to a difference between a first EGR flow rate estimated via the MAP-MAF strategy and a second EGR flow rate estimated via a Differential Pressure Over Valve (DPOV) strategy being within a threshold, the DPOV strategy based on a difference between an output of a first pressure sensor coupled to an exhaust passage of the EGR system upstream of the EGR valve, and a second pressure sensor coupled to the exhaust passage of the EGR system downstream of the EGR valve. In a fourth example of the method, optionally including one or more or each of the first through third examples, intrusively commanding the EGR valve of the EGR system to the closed position to confirm the diagnosed excessive EGR flow rate further comprises: after commanding the EGR valve to the closed position: generating a first estimated no-flow EGR flow rate based on the DPOV strategy, generating a second estimated no-flow EGR flow rate based on the MAP-MAF strategy, in response to all of: a difference between the first estimated no-flow EGR flow rate and the second estimated no-flow EGR flow rate being below a first threshold, a difference between a first excessive EGR flow rate diagnosed based on the first estimated no-flow EGR flow rate and a second excessive EGR flow rate diagnosed based on the first estimated EGR flow rate prior to commanding the EGR valve to the closed position being below the first threshold, a difference between a third excessive EGR flow rate diagnosed based on the second estimated no-flow EGR flow rate and a fourth excessive EGR flow rate diagnosed based on the second estimated EGR flow rate prior to commanding the EGR valve to the closed position being below the first threshold, and both of the first estimated no-flow EGR flow rate and the second estimated no-flow EGR flow rate exceeding a second threshold for excessive EGR flow, setting a diagnostic code of the vehicle indicating the excessive EGR flow. In a fifth example of the method, optionally including one or more or each of the first through fourth examples, the second threshold for excessive EGR flow is approximately 3.5% above an expected EGR flow, the expected EGR flow determined from a speed/load lookup table populated with EGR flow rates at steady state engine conditions. In a sixth example of the method, optionally including one or more or each of the first through fifth examples, intrusively commanding the EGR valve of the EGR system to the closed position to confirm the diagnosed excessive EGR flow rate further comprises comparing a change in the EGR flow rate calculated with DPOV with a corresponding change in a position of the EGR valve. In a seventh example of the method, optionally including one or more or each of the first through sixth examples, comparing the change in the EGR flow rate calculated with DPOV with the corresponding change in a position of the EGR valve further comprises: after commanding the EGR valve to the closed position: generating a first estimated no-flow EGR flow rate based on the DPOV strategy, adjusting the EGR valve from the closed position to a slightly more open position, generating a second estimated no-flow EGR flow rate based on the DPOV strategy, and in response to a difference between the second estimated no-flow EGR flow rate and the first estimated no-flow EGR flow rate not exceeding a threshold difference, confirming the diagnosed excessive EGR flow rate. In a eighth example of the method, optionally including one or more or each of the first through seventh examples, intrusively commanding the EGR valve of the EGR system to the closed position to confirm the diagnosed excessive EGR flow rate further comprises: prior to commanding the EGR valve to the closed position: combining the first estimated EGR flow rate and the second estimated EGR flow rate to generate a first arbitrated EGR flow rate, after commanding the EGR valve to the closed position: generating a first estimated no-flow EGR flow rate based on the DPOV strategy, generating a second estimated no-flow EGR flow rate based on the MAP-MAF strategy, combining the first estimated no-flow EGR flow rate and the second estimated no-flow EGR flow rate to generate a second arbitrated EGR flow rate, in response to both of: a difference between a first excessive EGR flow rate diagnosed based on the first arbitrated EGR flow rate and a second excessive EGR flow rate diagnosed based on the second arbitrated EGR flow rate being below a first threshold, and the second arbitrated EGR flow rate exceeding a second threshold for excessive EGR flow, setting a diagnostic code of the vehicle indicating the excessive EGR flow. In a ninth example of the method, optionally including one or more or each of the first through eighth examples: the first arbitrated EGR flow rate is an average of the first estimated EGR flow rate and the second estimated EGR flow rate, and the second arbitrated EGR flow rate is an average of the first estimated no-flow EGR flow rate and the second estimated no-flow EGR flow rate. In a tenth example of the method, optionally including one or more or each of the first through ninth examples, the first arbitrated EGR flow rate is a weighted average of the first estimated EGR flow rate and the second estimated EGR flow rate, where a weighting of the first estimated EGR flow rate is adjusted based on a magnitude of the first estimated EGR flow rate, and the second arbitrated EGR flow rate is a weighted average of the first estimated no-flow EGR flow rate and the second estimated no-flow EGR flow rate, where a weighting of the first estimated no-flow EGR flow rate is adjusted based on a magnitude of the first estimated no-flow EGR flow rate. In a eleventh example of the method, optionally including one or more or each of the first through tenth examples, adjusting the weighting of the first estimated EGR flow rate based on the magnitude of the first estimated EGR flow rate further comprises increasing the weighting of the first estimated EGR flow rate when the first estimated EGR flow rate is lower, and decreasing the weighting of the first estimated EGR flow rate when the first estimated EGR flow rate is higher, and adjusting the weighting of the first estimated no-flow EGR flow rate based on the magnitude of the first estimated no-flow EGR flow rate further comprises increasing the weighting of the first estimated no-flow EGR flow rate when the first estimated no-flow EGR flow rate is lower, and decreasing the weighting of the first estimated no-flow EGR flow rate when the first estimated no-flow EGR flow rate is higher.

The disclosure also provides support for a system for an engine, comprising: an exhaust gas recirculation (EGR) valve housed in an EGR passage of the engine, the EGR valve controlling EGR flow through the EGR passage, a manifold air pressure (MAP) sensor coupled to an engine intake manifold, a measured engine airflow (MAF) sensor coupled to the EGR passage, and a controller storing instructions in non-transitory memory that, when executed, cause the controller to: measure a first EGR pressure upstream of the EGR valve via a first EGR pressure sensor, measure a second EGR pressure downstream of the EGR valve via a second EGR pressure sensor, estimate a first Differential Pressure Over Valve (DPOV) EGR flow rate based on a difference between the first EGR pressure and the second EGR pressure, in response to the DPOV EGR flow rate exceeding a diagnostic threshold: generate a first estimated MAP-MAF EGR flow rate based on a difference between an output of the MAP sensor and an output of the MAF sensor, in response to a difference between the first estimated MAP-MAF EGR flow rate and the DPOV EGR flow rate being within a first threshold, diagnosing an excessive EGR flow rate, in response to intrusive stable conditions of the engine being met, intrusively commanding the EGR valve to a closed position to confirm the diagnosed excessive EGR flow rate. In a first example of the system, intrusively commanding the EGR valve to the closed position to confirm the diagnosed excessive EGR flow rate further comprises: after commanding the EGR valve to the closed position, generating a second estimated MAP-MAF EGR flow rate based on the difference between the output of the MAP sensor and the output of the MAF sensor, in response to a difference between a second diagnosed excessive EGR flow based on the second estimated MAP-MAF EGR flow rate and a first diagnosed excessive EGR flow based on the first estimated MAP-MAF EGR flow rate being within the first threshold, and the second estimated MAP-MAF EGR flow rate exceeding the diagnostic threshold, setting a diagnostic code for the excessive EGR flow rate. In a second example of the system, optionally including the first example, the non-transitory memory includes further instructions that when executed, cause the controller to: after commanding the EGR valve to the closed position, estimate a second DPOV EGR flow rate based on a difference between the first EGR pressure and the second EGR pressure, in response to a difference between the second estimated DPOV EGR flow rate and the second estimated MAP-MAF EGR flow rate being within the first threshold and the second estimated MAP-MAF EGR flow rate exceeding the diagnostic threshold, setting the diagnostic code for the excessive EGR flow rate, and in response to the difference between the second estimated DPOV EGR flow rate and the second estimated MAP-MAF EGR flow rate not being within the first threshold, not setting the diagnostic code for the excessive EGR flow rate. In a third example of the system, optionally including one or both of the first and second examples, the non-transitory memory includes further instructions that when executed, cause the controller to: in response to the difference between the second estimated DPOV EGR flow rate and the second estimated MAP-MAF EGR flow rate being within the first threshold and the second estimated MAP-MAF EGR flow rate exceeding the diagnostic threshold: adjust the EGR valve from the closed position to a slightly more open position, estimate a third DPOV EGR flow rate based on the difference between the first EGR pressure and the second EGR pressure, in response to a difference between the third DPOV EGR flow rate and the second DPOV EGR flow rate not exceeding a second threshold, setting the diagnostic code for the excessive EGR flow rate, and in response to the difference between the third DPOV EGR flow rate and the second DPOV EGR flow rate exceeding the second threshold, not setting the diagnostic code for the excessive EGR flow rate.

The disclosure also provides support for a method for an exhaust gas recirculation (EGR) system of a vehicle, the method comprising: performing a first diagnosis of an excessive EGR flow rate via a first strategy, performing a first verification of the excessive EGR flow rate via a second strategy, commanding an EGR valve of the EGR system to a closed position, performing a second diagnosis of the excessive EGR flow rate under no-flow conditions via the first strategy, performing a second verification of the excessive EGR flow rate under no-flow conditions via the second strategy, in response to all of: a difference between the first diagnosed excessive EGR flow rate and the first verified EGR flow rate being below a first threshold, a difference between the second diagnosed excessive EGR flow rate and the second verified EGR flow rate being below the first threshold, a difference between the first diagnosed excessive EGR flow rate and the second diagnosed EGR flow rate being below the first threshold, a difference between the first verified excessive EGR flow rate and the second verified EGR flow rate being below the first threshold, and one of the first diagnosed excessive EGR flow rate, the first verified excessive EGR flow rate, the second diagnosed excessive EGR flow rate, and the second verified excessive EGR flow rate being above a second threshold, setting a diagnostic code of the EGR system to indicate the excessive EGR flow rate. In a first example of the method, the first strategy is a Differential Pressure Over Valve (DPOV) strategy based on an output of a first EGR pressure sensor of the EGR system positioned upstream of the EGR valve and a second EGR pressure sensor of the EGR system positioned downstream of the EGR valve, and the second strategy is a MAP-MAF strategy based on based on a difference between an output of a manifold absolute pressure (MAP) sensor of the vehicle and an output of a mass airflow (MAF) sensor of the vehicle. In a second example of the method, optionally including the first example, the second threshold is a diagnostic threshold for excessive EGR flow, the diagnostic threshold based on an expected EGR flow, the expected EGR flow determined from a speed/load lookup table populated with EGR flow rates at steady state engine conditions. In a third example of the method, optionally including one or both of the first and second examples, in a first condition, wherein: the difference between the first diagnosed excessive EGR flow rate and the first verified EGR flow rate is below a first threshold, the difference between the second diagnosed excessive EGR flow rate and the second verified EGR flow rate is below the first threshold, the difference between the first diagnosed excessive EGR flow rate and the second diagnosed EGR flow rate is below the first threshold, the difference between the first verified excessive EGR flow rate and the second verified EGR flow rate is below the first threshold, and one of the first diagnosed excessive EGR flow rate, the first verified excessive EGR flow rate, the second diagnosed excessive EGR flow rate, and the second verified excessive EGR flow rate is above the second threshold, the diagnostic code of the EGR system is set to indicate the excessive EGR flow rate, and in a second condition, wherein one of: the difference between the first diagnosed excessive EGR flow rate and the first verified EGR flow rate is not below the first threshold, the difference between the second diagnosed excessive EGR flow rate and the second verified EGR flow rate is not below the first threshold, the difference between the first diagnosed excessive EGR flow rate and the second diagnosed EGR flow rate is not below the first threshold, the difference between the first verified excessive EGR flow rate and the second verified EGR flow rate is not below the first threshold, and none of the first diagnosed excessive EGR flow rate, the first verified excessive EGR flow rate, the second diagnosed excessive EGR flow rate, and the second verified excessive EGR flow rate are above the second threshold, the diagnostic code of the EGR system is not set to indicate the excessive EGR flow rate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an exhaust gas recirculation (EGR) system of a vehicle, the method comprising:
    diagnosing an excessive EGR flow rate via an MAP-MAF strategy, the MAP-MAF strategy including estimating an EGR flow rate based on a difference between an output of a manifold absolute pressure (MAP) sensor of the vehicle and an output of a mass airflow (MAF) sensor of the vehicle; and
    in response to stable intrusive conditions being met, intrusively commanding an EGR valve of the EGR system to a closed position to confirm the diagnosed excessive EGR flow rate.

2. The method of claim 1, wherein the stable intrusive conditions include a speed of an engine of the vehicle exceeding a threshold engine speed, the threshold engine speed a speed where an airflow rate of the engine is within a range where the output of the MAF sensor is above a threshold accuracy.

3. The method of claim 1, wherein estimating the EGR flow rate based on the difference between the output of the MAP sensor and the output of the MAF sensor further comprises:
    calculating an estimated airflow into an engine of the vehicle as a function of the output of the MAP sensor and one or more additional parameters, the one or more additional parameters including an engine volumetric efficiency calibration term, an engine speed, and a temperature of the airflow; and
    subtracting an airflow measurement outputted by the MAF sensor from the estimated airflow to generate an estimated EGR flow rate.

4. The method of claim 1, wherein the EGR valve is intrusively commanded to the closed position to confirm the diagnosed excessive EGR flow rate in response to a difference between a first EGR flow rate estimated via the MAP-MAF strategy and a second EGR flow rate estimated via a Differential Pressure Over Valve (DPOV) strategy being within a threshold, the DPOV strategy based on a difference between an output of a first pressure sensor coupled to an exhaust passage of the EGR system upstream of the EGR valve, and a second pressure sensor coupled to the exhaust passage of the EGR system downstream of the EGR valve.

5. The method of claim 4, wherein intrusively commanding the EGR valve of the EGR system to the closed position to confirm the diagnosed excessive EGR flow rate further comprises:
    after commanding the EGR valve to the closed position:

generating a first estimated no-flow EGR flow rate based on the DPOV strategy;
generating a second estimated no-flow EGR flow rate based on the MAP-MAF strategy;
in response to all of:
  a difference between the first estimated no-flow EGR flow rate and the second estimated no-flow EGR flow rate being below a first threshold;
  a difference between a first excessive EGR flow rate diagnosed based on the first estimated no-flow EGR flow rate and a second excessive EGR flow rate diagnosed based on the first estimated EGR flow rate prior to commanding the EGR valve to the closed position being below the first threshold;
  a difference between a third excessive EGR flow rate diagnosed based on the second estimated no-flow EGR flow rate and a fourth excessive EGR flow rate diagnosed based on the second estimated EGR flow rate prior to commanding the EGR valve to the closed position being below the first threshold; and
  both of the first estimated no-flow EGR flow rate and the second estimated no-flow EGR flow rate exceeding a second threshold for excessive EGR flow; setting a diagnostic code of the vehicle indicating the excessive EGR flow.

6. The method of claim 5, wherein the second threshold for excessive EGR flow is approximately 3.5% above an expected EGR flow, the expected EGR flow determined from a speed/load lookup table populated with EGR flow rates at steady state engine conditions.

7. The method of claim 5, wherein intrusively commanding the EGR valve of the EGR system to the closed position to confirm the diagnosed excessive EGR flow rate further comprises comparing a change in the EGR flow rate calculated with DPOV with a corresponding change in a position of the EGR valve.

8. The method of claim 7, wherein comparing the change in the EGR flow rate calculated with DPOV with the corresponding change in a position of the EGR valve further comprises:
  after commanding the EGR valve to the closed position:
    generating a first estimated no-flow EGR flow rate based on the DPOV strategy;
    adjusting the EGR valve from the closed position to a slightly more open position;
    generating a second estimated no-flow EGR flow rate based on the DPOV strategy; and
    in response to a difference between the second estimated no-flow EGR flow rate and the first estimated no-flow EGR flow rate not exceeding a threshold difference, confirming the diagnosed excessive EGR flow rate.

9. The method of claim 4, wherein intrusively commanding the EGR valve of the EGR system to the closed position to confirm the diagnosed excessive EGR flow rate further comprises:
  prior to commanding the EGR valve to the closed position:
    combining the first estimated EGR flow rate and the second estimated EGR flow rate to generate a first arbitrated EGR flow rate;
  after commanding the EGR valve to the closed position:
    generating a first estimated no-flow EGR flow rate based on the DPOV strategy;
    generating a second estimated no-flow EGR flow rate based on the MAP-MAF strategy;
    combining the first estimated no-flow EGR flow rate and the second estimated no-flow EGR flow rate to generate a second arbitrated EGR flow rate;
  in response to both of:
    a difference between a first excessive EGR flow rate diagnosed based on the first arbitrated EGR flow rate and a second excessive EGR flow rate diagnosed based on the second arbitrated EGR flow rate being below a first threshold; and
    the second arbitrated EGR flow rate exceeding a second threshold for excessive EGR flow;
  setting a diagnostic code of the vehicle indicating the excessive EGR flow.

10. The method of claim 9, wherein:
the first arbitrated EGR flow rate is an average of the first estimated EGR flow rate and the second estimated EGR flow rate; and
the second arbitrated EGR flow rate is an average of the first estimated no-flow EGR flow rate and the second estimated no-flow EGR flow rate.

11. The method of claim 9, wherein:
the first arbitrated EGR flow rate is a weighted average of the first estimated EGR flow rate and the second estimated EGR flow rate, where a weighting of the first estimated EGR flow rate is adjusted based on a magnitude of the first estimated EGR flow rate; and
the second arbitrated EGR flow rate is a weighted average of the first estimated no-flow EGR flow rate and the second estimated no-flow EGR flow rate, where a weighting of the first estimated no-flow EGR flow rate is adjusted based on a magnitude of the first estimated no-flow EGR flow rate.

12. The method of claim 11, wherein:
adjusting the weighting of the first estimated EGR flow rate based on the magnitude of the first estimated EGR flow rate further comprises increasing the weighting of the first estimated EGR flow rate when the first estimated EGR flow rate is lower, and decreasing the weighting of the first estimated EGR flow rate when the first estimated EGR flow rate is higher; and
adjusting the weighting of the first estimated no-flow EGR flow rate based on the magnitude of the first estimated no-flow EGR flow rate further comprises increasing the weighting of the first estimated no-flow EGR flow rate when the first estimated no-flow EGR flow rate is lower, and decreasing the weighting of the first estimated no-flow EGR flow rate when the first estimated no-flow EGR flow rate is higher.

13. A system for an engine, comprising:
an exhaust gas recirculation (EGR) valve housed in an EGR passage of the engine, the EGR valve controlling EGR flow through the EGR passage;
a manifold air pressure (MAP) sensor coupled to an engine intake manifold;
a measured engine airflow (MAF) sensor coupled to the EGR passage; and
a controller storing instructions in non-transitory memory that, when executed, cause the controller to:
  measure a first EGR pressure upstream of the EGR valve via a first EGR pressure sensor;
  measure a second EGR pressure downstream of the EGR valve via a second EGR pressure sensor;
  estimate a first Differential Pressure Over Valve (DPOV) EGR flow rate based on a difference between the first EGR pressure and the second EGR pressure;

in response to the DPOV EGR flow rate exceeding a diagnostic threshold:
  generate a first estimated MAP-MAF EGR flow rate based on a difference between an output of the MAP sensor and an output of the MAF sensor;
  in response to a difference between the first estimated MAP-MAF EGR flow rate and the DPOV EGR flow rate being within a first threshold, diagnosing an excessive EGR flow rate;
  in response to intrusive stable conditions of the engine being met, intrusively commanding the EGR valve to a closed position to confirm the diagnosed excessive EGR flow rate.

14. The system of claim 13, wherein intrusively commanding the EGR valve to the closed position to confirm the diagnosed excessive EGR flow rate further comprises:
  after commanding the EGR valve to the closed position, generating a second estimated MAP-MAF EGR flow rate based on the difference between the output of the MAP sensor and the output of the MAF sensor;
  in response to a difference between a second diagnosed excessive EGR flow based on the second estimated MAP-MAF EGR flow rate and a first diagnosed excessive EGR flow based on the first estimated MAP-MAF EGR flow rate being within the first threshold, and the second estimated MAP-MAF EGR flow rate exceeding the diagnostic threshold, setting a diagnostic code for the excessive EGR flow rate.

15. The system of claim 14, wherein the non-transitory memory includes further instructions that when executed, cause the controller to:
  after commanding the EGR valve to the closed position, estimate a second DPOV EGR flow rate based on a difference between the first EGR pressure and the second EGR pressure;
  in response to a difference between the second estimated DPOV EGR flow rate and the second estimated MAP-MAF EGR flow rate being within the first threshold and the second estimated MAP-MAF EGR flow rate exceeding the diagnostic threshold, setting the diagnostic code for the excessive EGR flow rate; and
  in response to the difference between the second estimated DPOV EGR flow rate and the second estimated MAP-MAF EGR flow rate not being within the first threshold, not setting the diagnostic code for the excessive EGR flow rate.

16. The system of claim 15, wherein the non-transitory memory includes further instructions that when executed, cause the controller to:
  in response to the difference between the second estimated DPOV EGR flow rate and the second estimated MAP-MAF EGR flow rate being within the first threshold and the second estimated MAP-MAF EGR flow rate exceeding the diagnostic threshold:
    adjust the EGR valve from the closed position to a slightly more open position;
    estimate a third DPOV EGR flow rate based on the difference between the first EGR pressure and the second EGR pressure;
  in response to a difference between the third DPOV EGR flow rate and the second DPOV EGR flow rate not exceeding a second threshold, setting the diagnostic code for the excessive EGR flow rate; and
  in response to the difference between the third DPOV EGR flow rate and the second DPOV EGR flow rate exceeding the second threshold, not setting the diagnostic code for the excessive EGR flow rate.

17. A method for an exhaust gas recirculation (EGR) system of a vehicle, the method comprising:
  performing a first diagnosis of an excessive EGR flow rate via a first strategy;
  performing a first verification of the excessive EGR flow rate via a second strategy;
  commanding an EGR valve of the EGR system to a closed position;
  performing a second diagnosis of the excessive EGR flow rate under no-flow conditions via the first strategy;
  performing a second verification of the excessive EGR flow rate under no-flow conditions via the second strategy;
  in response to all of:
    a difference between the first diagnosed excessive EGR flow rate and the first verified EGR flow rate being below a first threshold;
    a difference between the second diagnosed excessive EGR flow rate and the second verified EGR flow rate being below the first threshold;
    a difference between the first diagnosed excessive EGR flow rate and the second diagnosed EGR flow rate being below the first threshold;
    a difference between the first verified excessive EGR flow rate and the second verified EGR flow rate being below the first threshold; and
    one of the first diagnosed excessive EGR flow rate, the first verified excessive EGR flow rate, the second diagnosed excessive EGR flow rate, and the second verified excessive EGR flow rate being above a second threshold;
  setting a diagnostic code of the EGR system to indicate the excessive EGR flow rate, wherein:
    the first strategy is a Differential Pressure Over Valve (DPOV) strategy based on an output of a first EGR pressure sensor of the EGR system positioned upstream of the EGR valve and a second EGR pressure sensor of the EGR system positioned downstream of the EGR valve; and
    the second strategy is a MAP-MAF strategy based on based on a difference between an output of a manifold absolute pressure (MAP) sensor of the vehicle and an output of a mass airflow (MAF) sensor of the vehicle.

18. The method of claim 17, wherein the second threshold is a diagnostic threshold for excessive EGR flow, the diagnostic threshold based on an expected EGR flow, the expected EGR flow determined from a speed/load lookup table populated with EGR flow rates at steady state engine conditions.

19. The method of claim 17, wherein:
  in a first condition, wherein:
    the difference between the first diagnosed excessive EGR flow rate and the first verified EGR flow rate is below a first threshold;
    the difference between the second diagnosed excessive EGR flow rate and the second verified EGR flow rate is below the first threshold;
    the difference between the first diagnosed excessive EGR flow rate and the second diagnosed EGR flow rate is below the first threshold;
    the difference between the first verified excessive EGR flow rate and the second verified EGR flow rate is below the first threshold; and
    one of the first diagnosed excessive EGR flow rate, the first verified excessive EGR flow rate, the second diagnosed excessive EGR flow rate; and the second verified excessive EGR flow rate is above the second threshold;

the diagnostic code of the EGR system is set to indicate the excessive EGR flow rate; and in a second condition, wherein one of:

the difference between the first diagnosed excessive EGR flow rate and the first verified EGR flow rate is not below the first threshold;

the difference between the second diagnosed excessive EGR flow rate and the second verified EGR flow rate is not below the first threshold;

the difference between the first diagnosed excessive EGR flow rate and the second diagnosed EGR flow rate is not below the first threshold;

the difference between the first verified excessive EGR flow rate and the second verified EGR flow rate is not below the first threshold; and none of the first diagnosed excessive EGR flow rate, the first verified excessive EGR flow rate, the second diagnosed excessive EGR flow rate; and the second verified excessive EGR flow rate are above the second threshold;

the diagnostic code of the EGR system is not set to indicate the excessive EGR flow rate.

* * * * *